Dec. 15, 1953 G. DI LORENZO 2,662,487
INTERNAL-COMBUSTION PUMP
Filed Oct. 6, 1949
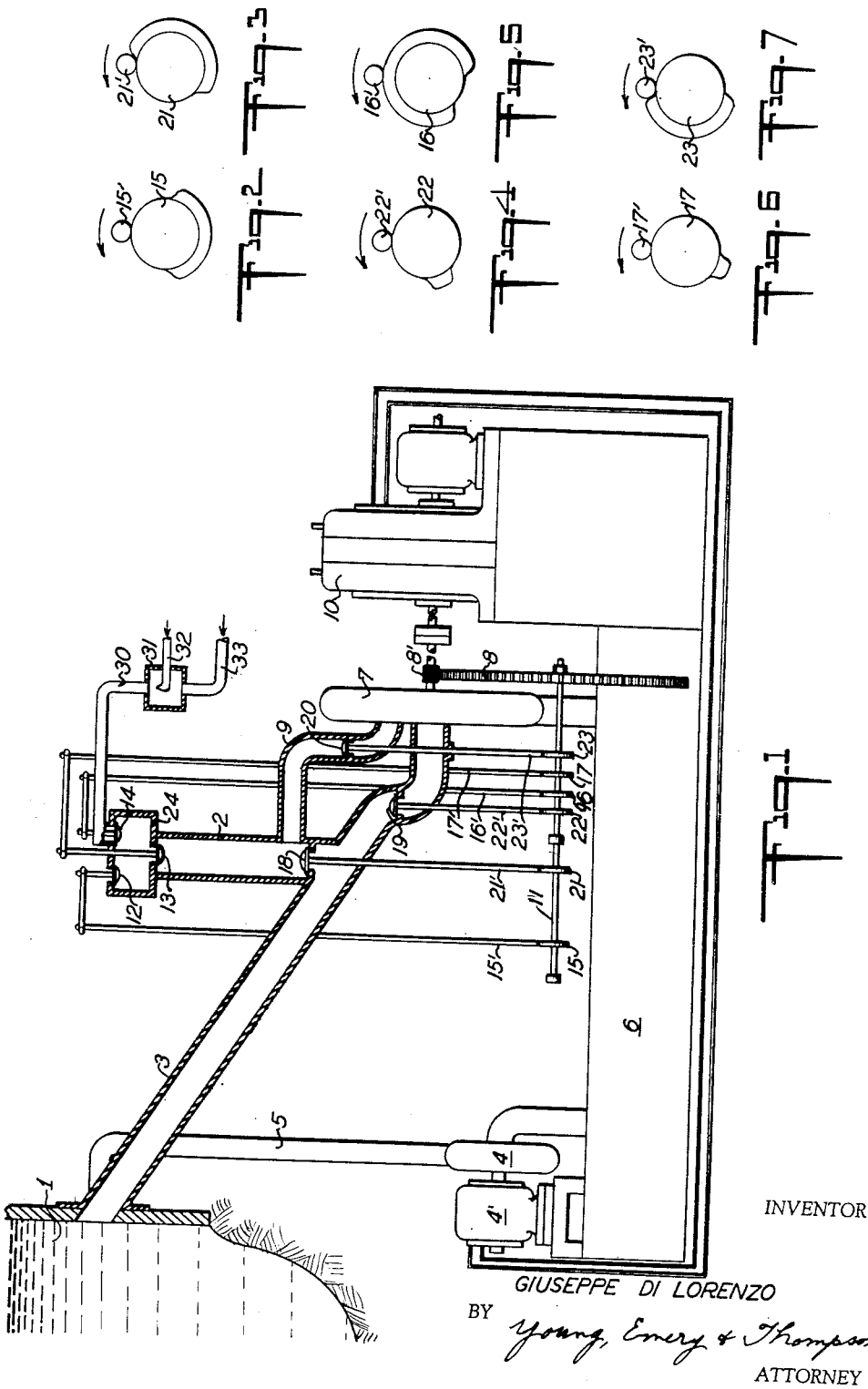
INVENTOR
GIUSEPPE DI LORENZO
BY Young, Emery & Thompson
ATTORNEY Patented Dec. 15, 1953

2,662,487

UNITED STATES PATENT OFFICE 2,662,487

INTERNAL-COMBUSTION PUMP

Giuseppe Di Lorenzo, Milan, Italy

Application October 6, 1949, Serial No. 119,845

Claims priority, application Italy October 13, 1948

3 Claims. (Cl. 103—249)

The present invention relates to a hydraulic installation of simple construction and of low fuel consumption for supplying liquid under pressure.

The installation comprises a hydraulic turbine operating from the water of a penstock or pressure conduit, and from a branch of the same, wherein the pressure is increased by means of a combustion pump and by taking advantage of the water hammer in the pressure conduit.

The invention shall be described more in detail with reference to the appended drawing in which:

Figure 1 is a schematic view, partly in section, of the apparatus constituting the invention; and Figs. 2–7 are schematic showings of the various actuating cams, in one position.

The installation comprises two reservoirs or basins 1 and 6 positioned at different levels, the level difference being calculated according to the power it is desired to generate.

The water contained in the lower reservoir 6 may be raised to the upper reservoir 1 through a conduit 5 by means of pump 4.

From the upper reservoir 1 leads a pressure conduit 3 that ends at the turbine 7 and is closed just before the inlet opening of the turbine by a control valve 19. Ahead of said valve 19 there branches out a bypass conduit 9 that also ends at turbine 7. Said bypass conduit is closed by a valve 18 controlled by a cam or the like, and the conduit 9 is also closed by a valve 20, controlled by a cam or the like. The bypass conduit 9 leads from an upstanding container forming a chamber 2 full of air, and which is connected to a vessel forming a combustion chamber 24 closed by three valves and namely: the inlet valve 14 for the carbureted mixture, discharge valve 12 for the burned mixture and the scavenging air, and valve 13 which separates combustion chamber 24 from air chamber 2. All of these valves are controlled by cams keyed on a single shaft 11 driven from turbine 7 through gears 8 and 8'. The turbine drives also electric generator 10. More precisely, valve 12 is controlled by linkage 15' from cam 15, valve 18 by linkage 21' from cam 21, valve 19 by linkage 22' from cam 22, valve 14 by linkage 16' from cam 16, valve 13 by linkage 17' from cam 17 and valve 20 by linkage 23' from cam 23.

The operation of the installation is as follows:

*1st stroke.*—With the upper reservoir 1 filled with water, the water flows through conduit 3 arriving at turbine 7 at a velocity depending on the difference in level between reservoirs 1 and 6. Turbine 7 is therefore started. The turbine motion is thus transmitted by means of gears 8 and 8' to electric generator 10, and to shaft 11 on which there are keyed the six cams that control the valves. During the first cycle, the cams are arranged so that valves 19 and 14 are open, while valves 12, 13 and 20 are closed, and valve 18 is going to be opened at this very time. Therefore the water that imparts the movement to turbine 7 also enters the air chamber 2 through valve 18 which is then opened. Since valve 13 is closed, the air contained in chamber 2 is compressed almost at the full water head pressure.

The compressed air is in communication with conduit 33 by a fluid connection (not shown) and through conduit 33 with the carburetor chamber 31 where it is mixed with fuel entering said chamber 31 through conduit 32 and the mixture is conducted through the conduit 30, through the open valve 14, into the combustion chamber 24 during the time the valve is open.

*2nd stroke.*—Now valve 19 is quickly closed so that in conduit 3 there is produced the so-called water hammer which pushes another quantity of water in the air chamber 2, further compressing the air cushion above the water previously entered. The pressure of said air may be calculated in relation to the energy of the water hammer; that is of the closing speed of valve 19 and of the water head.

Valve 18 is now closed, trapping the water entered in chamber 2. At this same time, the firing and combustion of the carbureted mixture in chamber 24 takes place, thereby remarkably increasing the pressure in said chamber, and at the end of this second stroke or step, valve 13 opens so that the pressure of the air standing above urges the water in conduit 9 with a pressure increased in respect to the initial head in pressure conduit 3. Even during the closure of valve 19, the turbine had continued to turn by inertia and also because the generator 10 functions as a flywheel.

*3rd stroke.*—Valve 20 is now opened and the water contained in conduit 9 is urged at high pressure into turbine 7 so that the turbine gathers a much higher speed and the generator is quickly spinning up. The turbine 7 drives shaft 11 and the generator 10 feeds current to the motor 4' of the pump 4.

During this stroke or step, the air chamber has not been completely emptied, and there remains therein a certain amount of air, at a pressure lower than at the beginning but sufficient to expel the burned gases from combustion chamber through valve 12, thus effecting the scavenging of said chamber.

*4th stroke.*—The water left in the air chamber continues to flow to the turbine 7 which keeps on running almost at the same speed as in the preceding step, since other water is admitted to the turbine through valve 19 not opened. Meanwhile the air chamber has been almost completely emptied of the water it contained. Thus the pressure of the air standing above is reduced to below the atmospheric pressure. Through valve 14, other carbureted air is sucked into the combustion chamber, and into the air chamber after which valve 13 is closed.

The four strokes described above will go on in repetition time and again with a duration of about one second each. From this moment on the installation will continue to operate almost automatically; in a manner similar to that of an internal combustion engine, the electric power generated by the alternator will drive the pump motor so that the water will steadily flow from upper reservoir 1 to feed the turbine and discharge in the lower reservoir 6, from which the pump will raise it again to the upper reservoir.

Of course the constructive details of the installation will have to vary according to the power it is designed to deliver, according to the size of the two reservoirs, and to the difference between their levels, and the size of the internal combustion pump without therefore departing from the scope of the present invention.

What I claim is:

1. An apparatus for supplying liquid under pressure comprising a main conduit having an upper liquid receiving end and a lower discharge end, a liquid feed reservoir at an elevation above said conduit for feeding liquid to the upper end of said conduit, a control valve in said conduit adjacent the lower discharge end thereof, an upstanding container forming air chamber connected at its lower portion with the main conduit adjacent and upstream of the control valve, a by-pass valve for controlling communication between the main conduit and said air chamber, a by-pass conduit communicating at one end with the lower portion of the air chamber and having a discharge end positioned adjacent the lower end of the main conduit, a third valve in said by-pass conduit, a vessel forming a combustion chamber connected to the upper portion of the air chamber at a level below the feed reservoir, means for supplying fuel to the combustion chamber, means for exhausting spent gas from the combustion chamber, a fourth valve controlling communication between the combustion chamber and the upper portion of the air chamber, and valve actuating mechanism operable cyclically for first supplying liquid from the reservoir through the main conduit directly to the lower discharge end thereof, secondly, opening the bypass valve to admit liquid from the main conduit to the lower portion of the air chamber and compress air in the upper portion thereof, thirdly, to suddenly close the control valve and produce a water hammer effect to thereby force additional liquid from the main conduit into the air chamber, and fourthly, close the by-pass valve and open the third and fourth valves to enable combustion products under pressure in the combustion chamber to force liquid in the air chamber through the by-pass conduit to the discharge end thereof.

2. An apparatus for supplying liquid under pressure comprising a main conduit having an upper liquid receiving end and a lower discharge end, a liquid feed reservoir at an elevation above said conduit for feeding liquid to the upper end of said conduit, a control valve in said conduit adjacent the lower discharge end thereof, a by-pass conduit having one end communicating with said main conduit adjacent to and upstream of said control valve and its other end positioned adjacent the lower end of the main conduit, a by-pass valve at the juncture of the by-pass conduit and the main conduit, a vessel forming a combustion chamber positioned at a level above the discharge ends of the conduits and below the reservoir end of the main conduit, said combustion chamber having a fuel inlet opening and valve, an exhaust opening and valve and a pressure opening and valve, a container forming an air chamber extending upwardly from the bypass conduit and communicating at its upper portion with the combustion chamber through the pressure opening, a third valve in the by-pass conduit between the air chamber and the lower end of the by-pass conduit, and valve actuating mechanism controlling the positions of said valves and operable to cyclically supply liquid from the reservoir through the main conduit directly to the lower end thereof, to admit liquid to the lower portion of the air chamber to compress air in the upper portion thereof, to suddenly close the control valve and thereby produce a water hammer effect and force additional liquid into the air chamber and further compress the air in the upper portion thereof, to close the by-pass valve and open the pressure opening valve of the combustion chamber and the third valve for the flow of the products of combustion from the combustion chamber into the air chamber and to force liquid from the lower end of the air chamber and in the by-pass conduit to the discharge end of the latter.

3. An apparatus for supplying liquid under pressure comprising a main conduit having an upper liquid receiving end and a lower discharge end, a liquid feed reservoir at an elevation above said conduit for feeding liquid to the upper end of said conduit, a control valve in said conduit adjacent the lower discharge end thereof, a by-pass conduit having one end communicating with said main conduit adjacent to and upstream of said control valve and its other end positioned adjacent the lower end of the main conduit, a by-pass valve at the juncture of the by-pass conduit and the main conduit, a vessel forming a combustion chamber positioned at a level above the discharge ends of the conduits and below the reservoir end of the main conduit, said combustion chamber having a fuel inlet opening and valve, an exhaust opening and valve and a pressure opening and valve, a container forming an air chamber extending upwardly from the by-pass conduit and communicating at its upper portion with the combustion chamber through the pressure opening, a third valve in the by-pass conduit between the air chamber and the lower end of the by-pass conduit, and valve actuating mechanism including a rotary shaft and having a plurality of cams thereon, one for each valve for controlling the positions of said valves and operable to cyclically supply liquid from the reservoir through the main conduit directly to the lower end thereof, to admit liquid to the lower portion of the air chamber to compress air in the upper portion thereof, to suddenly close the control valve and thereby produce a water hammer effect and force additional liquid into the air chamber and further compress the air in the upper portion thereof, to close the by-pass valve and open the pressure opening valve of the combustion chamber and the third valve for the flow of the products of combustion from the combustion chamber into the air chamber and to force liquid from the lower end of the air chamber and in the by-pass conduit to the discharge end of the latter.

GIUSEPPE DI LORENZO.

References Cited in the file of this patent

UNITED STATES PATENTS

| Number | Name | Date |
|---|---|---|
| 1,095,974 | Wolff | May 5, 1914 |
| 1,263,981 | Wilkinson | Apr. 23, 1918 |
| 1,327,036 | Griffith | Jan. 6, 1920 |
| 1,494,008 | Nagler | May 13, 1924 |
| 1,725,881 | Porsche | Aug. 27, 1929 |
| 1,727,280 | Fottinger | Sept. 3, 1929 |
| 1,813,107 | Allner | July 7, 1931 |
| 1,941,845 | Lell | Jan. 2, 1934 |

FOREIGN PATENTS

| Number | Country | Date |
|---|---|---|
| 6,090 | Great Britain | Mar. 12, 1904 |
| 129,860 | Great Britain | July 24, 1919 |
| 349,563 | Germany | Mar. 3, 1922 |